United States Patent
Sun et al.

(10) Patent No.: US 10,768,626 B2
(45) Date of Patent: Sep. 8, 2020

(54) SYSTEM AND METHOD FOR PROVIDING MULTIPLE AGENTS FOR DECISION MAKING, TRAJECTORY PLANNING, AND CONTROL FOR AUTONOMOUS VEHICLES

(71) Applicant: TuSimple, Inc., San Diego, CA (US)

(72) Inventors: Xing Sun, San Diego, CA (US); Yufei Zhao, San Diego, CA (US); Wutu Lin, San Diego, CA (US); Zijie Xuan, San Diego, CA (US); Liu Liu, San Diego, CA (US); Kai-Chieh Ma, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 202 days.

(21) Appl. No.: 15/721,781

(22) Filed: Sep. 30, 2017

(65) Prior Publication Data

US 2019/0101923 A1 Apr. 4, 2019

(51) Int. Cl.
*G05D 1/02* (2020.01)
*B25J 9/16* (2006.01)
(Continued)

(52) U.S. Cl.
CPC .......... *G05D 1/0212* (2013.01); *B25J 9/1664* (2013.01); *B60W 30/00* (2013.01);
(Continued)

(58) Field of Classification Search
CPC .............. G05D 1/0212; G05D 1/0088; G05D 2201/0213; B25J 9/1664
See application file for complete search history.

(56) References Cited

U.S. PATENT DOCUMENTS 6,777,904 B1  8/2004  Degner
7,103,460 B1  9/2006  Breed
(Continued)

FOREIGN PATENT DOCUMENTS

EP  1754179 A1  2/2007
EP  2448251 A2  5/2012
(Continued)

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.
(Continued)

*Primary Examiner* — Rodney A Butler
(74) *Attorney, Agent, or Firm* — Paul Liu; Jim Salter

(57) ABSTRACT

A system and method for providing multiple agents for decision making, trajectory planning, and control for autonomous vehicles are disclosed. A particular embodiment includes: partitioning a multiple agent autonomous vehicle control module for an autonomous vehicle into a plurality of subsystem agents, the plurality of subsystem agents including a deep computing vehicle control subsystem and a fast response vehicle control subsystem; receiving a task request from a vehicle subsystem; dispatching the task request to the deep computing vehicle control subsystem or the fast response vehicle control subsystem based on content of the task request or a context of the autonomous vehicle; causing execution of the deep computing vehicle control subsystem or the fast response vehicle control subsystem by use of a data processor to produce a vehicle control output; and providing the vehicle control output to a vehicle control subsystem of the autonomous vehicle.

20 Claims, 7 Drawing Sheets

(51) Int. Cl.
*G05D 1/00* (2006.01)
*G06F 9/00* (2006.01)
*B60W 30/00* (2006.01)

(52) U.S. Cl.
CPC .............. *G05D 1/0088* (2013.01); *G06F 9/00* (2013.01); *G05D 2201/0213* (2013.01)

(56) References Cited

U.S. PATENT DOCUMENTS

| | | | |
|---|---|---|---|
| 7,689,559 B2 | 3/2010 | Canright | |
| 7,783,403 B2 | 8/2010 | Breed | |
| 7,844,595 B2 | 11/2010 | Canright | |
| 8,041,111 B1 | 10/2011 | Wilensky | |
| 8,064,643 B2 | 11/2011 | Stein | |
| 8,082,101 B2 | 12/2011 | Stein | |
| 8,164,628 B2 | 4/2012 | Stein | |
| 8,175,376 B2 | 5/2012 | Marchesotti | |
| 8,271,871 B2 | 9/2012 | Marchesotti | |
| 8,378,851 B2 | 2/2013 | Stein | |
| 8,392,117 B2 | 3/2013 | Dolgov | |
| 8,401,292 B2 | 3/2013 | Park | |
| 8,412,449 B2 | 4/2013 | Trepagnier | |
| 8,478,072 B2 | 7/2013 | Aisaka | |
| 8,553,088 B2 | 10/2013 | Stein | |
| 8,788,134 B1 | 7/2014 | Litkouhi | |
| 8,908,041 B2 | 12/2014 | Stein | |
| 8,917,169 B2 | 12/2014 | Schofield | |
| 8,963,913 B2 | 2/2015 | Baek | |
| 8,965,621 B1 | 2/2015 | Urmson | |
| 8,981,966 B2 | 3/2015 | Stein | |
| 8,993,951 B2 | 3/2015 | Schofield | |
| 9,002,632 B1 | 4/2015 | Emigh | |
| 9,008,369 B2 | 4/2015 | Schofield | |
| 9,025,880 B2 | 5/2015 | Perazzi | |
| 9,042,648 B2 | 5/2015 | Wang | |
| 9,111,444 B2 | 8/2015 | Kaganovich | |
| 9,117,133 B2 | 8/2015 | Barnes | |
| 9,118,816 B2 | 8/2015 | Stein | |
| 9,120,485 B1 | 9/2015 | Dolgov | |
| 9,122,954 B2 | 9/2015 | Srebnik | |
| 9,134,402 B2 | 9/2015 | Sebastian | |
| 9,145,116 B2 | 9/2015 | Clarke | |
| 9,147,255 B1 | 9/2015 | Zhang | |
| 9,156,473 B2 | 10/2015 | Clarke | |
| 9,176,006 B2 | 11/2015 | Stein | |
| 9,179,072 B2 | 11/2015 | Stein | |
| 9,183,447 B1 | 11/2015 | Gdalyahu | |
| 9,185,360 B2 | 11/2015 | Stein | |
| 9,191,634 B2 | 11/2015 | Schofield | |
| 9,233,659 B2 | 1/2016 | Rosenbaum | |
| 9,233,688 B2 | 1/2016 | Clarke | |
| 9,248,832 B2 | 2/2016 | Huberman | |
| 9,248,835 B2 | 2/2016 | Tanzmeister | |
| 9,251,708 B2 | 2/2016 | Rosenbaum | |
| 9,277,132 B2 | 3/2016 | Berberian | |
| 9,280,711 B2 | 3/2016 | Stein | |
| 9,286,522 B2 | 3/2016 | Stein | |
| 9,297,641 B2 | 3/2016 | Stein | |
| 9,299,004 B2 | 3/2016 | Lin | |
| 9,315,192 B1 | 4/2016 | Zhu | |
| 9,317,033 B2 | 4/2016 | Ibanez-Guzman | |
| 9,317,776 B1 | 4/2016 | Honda | |
| 9,330,334 B2 | 5/2016 | Lin | |
| 9,342,074 B2 | 5/2016 | Dolgov | |
| 9,355,635 B2 | 5/2016 | Gao | |
| 9,365,214 B2 | 6/2016 | Shalom | |
| 9,399,397 B2 | 7/2016 | Mizutani | |
| 9,428,192 B2 | 8/2016 | Schofield | |
| 9,436,880 B2 | 9/2016 | Bos | |
| 9,438,878 B2 | 9/2016 | Niebla | |
| 9,443,163 B2 | 9/2016 | Springer | |
| 9,446,765 B2 | 9/2016 | Shalom | |
| 9,459,515 B2 | 10/2016 | Stein | |
| 9,466,006 B2 | 10/2016 | Duan | |
| 9,476,970 B1 | 10/2016 | Fairfield | |
| 9,490,064 B2 | 11/2016 | Hirosawa | |
| 9,531,966 B2 | 12/2016 | Stein | |
| 9,535,423 B1 | 1/2017 | Debreczeni | |
| 9,555,803 B2 | 1/2017 | Pawlicki | |
| 9,568,915 B1 | 2/2017 | Berntorp | |
| 9,587,952 B1 | 3/2017 | Slusar | |
| 9,720,418 B2 | 8/2017 | Stenneth | |
| 9,723,097 B2 | 8/2017 | Harris | |
| 9,723,099 B2 | 8/2017 | Chen | |
| 9,738,280 B2 | 8/2017 | Rayes | |
| 9,746,550 B2 | 8/2017 | Nath | |
| 10,216,189 B1* | 2/2019 | Haynes | B60W 30/095 |
| 10,503,168 B1* | 12/2019 | Konrardy | G05D 1/0287 |
| 2007/0230792 A1 | 10/2007 | Shashua | |
| 2008/0249667 A1 | 10/2008 | Horvitz | |
| 2009/0040054 A1 | 2/2009 | Wang | |
| 2010/0049397 A1 | 2/2010 | Lin | |
| 2010/0226564 A1 | 9/2010 | Marchesotti | |
| 2010/0281361 A1 | 11/2010 | Marchesotti | |
| 2011/0206282 A1 | 8/2011 | Aisaka | |
| 2012/0105639 A1 | 5/2012 | Stein | |
| 2012/0140076 A1 | 6/2012 | Rosenbaum | |
| 2012/0274629 A1 | 11/2012 | Baek | |
| 2014/0145516 A1 | 5/2014 | Hirosawa | |
| 2014/0198184 A1 | 7/2014 | Stein | |
| 2015/0062304 A1 | 3/2015 | Stein | |
| 2015/0353082 A1 | 12/2015 | Lee | |
| 2016/0037064 A1 | 2/2016 | Stein | |
| 2016/0094774 A1 | 3/2016 | Li | |
| 2016/0129907 A1 | 5/2016 | Kim | |
| 2016/0165157 A1 | 6/2016 | Stein | |
| 2016/0210528 A1 | 7/2016 | Duan | |
| 2016/0321381 A1 | 11/2016 | English | |
| 2016/0375907 A1 | 12/2016 | Erban | |
| 2018/0032082 A1* | 2/2018 | Shalev-Shwartz | B60W 30/0953 |
| 2018/0203445 A1* | 7/2018 | Micks | G06F 17/5095 |
| 2018/0259968 A1* | 9/2018 | Frazzoli | G08G 1/166 |

FOREIGN PATENT DOCUMENTS

| | | |
|---|---|---|
| EP | 2463843 A2 | 6/2012 |
| EP | 2463843 A3 | 7/2013 |
| EP | 2761249 A2 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125022 | 8/2015 |
| WO | WO/2015/186002 A2 | 12/2015 |
| WO | WO/2015/186002 A3 | 12/2015 |
| WO | WO/2016/135736 | 9/2016 |
| WO | WO/2017/013875 A2 | 1/2017 |
| WO | WO/2014/111814 A3 | 7/2017 |

OTHER PUBLICATIONS

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching for Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and

(56) References Cited

OTHER PUBLICATIONS

Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302.5985, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.
Li, Yanghao and Wang, Naiyan and Liu, Jiaying and Hou, Xiaodi, "Demystifying Neural Style Transfer", arXiv preprint arXiv:1701.01036, 2017.
Hou' Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.
Li, Yanghao and Wang, Naiyan and Liu, Jiaying and Hou, Xiaodi, "Factorized Bilinear Models for Image Recognition", arXiv preprint arXiv:1611.05709, 2016.
Hou, Xiaodi, "Computational Modeling and Psychophysics in Low and Mid-Level Vision", California Institute of Technology, 2014.
Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.
Matthew Barth, Carrie Malcolm, Theodore Younglove, and Nicole Hill, "Recent Validation Efforts for a comprehensive Modal Emissions Model", Transportation Research Record 1750, Paper No. 01-0326, College of Engineering, Center for Environmental Research and Technology, University of California, Riverside, CA 92521, date unknown.
Kyoungho Ahn, Hesham Rakha, "The Effects of Route Choice Decisions on Vehicle Energy Consumption and Emissions", Virginia Tech Transportation Institute, Blacksburg, VA 24061, date unknown.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.
Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dull, Grauman, Kristen, "Active Image Segmentation Propagation", In Proceedings of the IEEE Conference on Computer Vision and Pattern Recognition (CVPR), Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv:1703.04977v1 [cs.CV] Mar. 15, 2017.
Wei, Junqing, John M. Dolan, Bakhtiar Litkhouhi, "A Prediction— and Cost Function-Based Algorithm for Robust Autonomous Freeway Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, March 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "Despot: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
Hlou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Li, Yanghao and Wang, Naiyan and Liu, Jiaying and I-lou, Xiaodi, "Factorized Bilinear Models for Image Recognition", arXiv preprint arXiv:1611.05709, 2016.
Spinello, Luciano, Triebel, Rudolph, Siegwart, Roland, "Multiclass Multimodal Detection and Tracking in Urban Environments", Sage Journals, vol. 29 issue: 12, page(s): 1498-1515 Article first published online: Oct. 7, 2010;Issue published: Oct. 1, 2010.
Matthew Barth, Canie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.

(56) References Cited

OTHER PUBLICATIONS

Kyoungho Ahn, Hesham Rakha, "The Effects of Route Choice Decisions on Vehicle Energy Consumption and Emissions", Virginia Tech Transportation Institute, date unknown.

* cited by examiner

```
                    Processing Logic for
        Multiple Agents for Decision Making, Trajectory Planning, and
                    Control for Autonomous Vehicles
                              -1000-
```

Partition a multiple agent autonomous vehicle control module for an autonomous vehicle into a plurality of subsystem agents, the plurality of subsystem agents including a deep computing vehicle control subsystem and a fast response vehicle control subsystem.
-1010-

Receive a task request from a vehicle subsystem.
-1020-

Determine if the task request is appropriate for the deep computing vehicle control subsystem or the fast response vehicle control subsystem based on content of the task request or a context of the autonomous vehicle.
-1030-

Dispatch the task request to the deep computing vehicle control subsystem or the fast response vehicle control subsystem based on the determination.
-1040-

Cause execution of the deep computing vehicle control subsystem or the fast response vehicle control subsystem by use of a data processor to produce a vehicle control output.
-1050-

Provide the vehicle control output to a vehicle control subsystem of the autonomous vehicle.
-1060-

End

Figure 6

SYSTEM AND METHOD FOR PROVIDING MULTIPLE AGENTS FOR DECISION MAKING, TRAJECTORY PLANNING, AND CONTROL FOR AUTONOMOUS VEHICLES

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2017, TuSimple, All Rights Reserved.

TECHNICAL FIELD

This patent document pertains generally to tools (systems, apparatuses, methodologies, computer program products, etc.) for vehicle control systems, and autonomous driving systems, route planning, trajectory planning, and more particularly, but not by way of limitation, to a system and method for providing multiple agents for decision making, trajectory planning, and control for autonomous vehicles.

BACKGROUND

Processing subsystems within autonomous vehicles typically include decision making subsystems, trajectory planning, and control operations, among other subsystems. These autonomous vehicle processing subsystems are responsible for receiving a substantial amount of sensor data and other input and for accurately processing this input data in real time. The processing loads can be very high and the available processing time is very short. The safety and efficiency of the autonomous vehicle and its occupants depend on the ability of these autonomous vehicle processing subsystems to perform as needed. It is certainly possible to configure an autonomous vehicle control system with high-powered and expensive data processing systems that will handle the processing loads. However, there is constant pressure in the marketplace to design and build autonomous vehicle control systems with lowest cost, lightest weight, lowest power requirements, lowest operating temperatures, and high levels of adaptability and customization. Conventional autonomous vehicle control systems have been unable to meet this challenge while providing responsive, reliable, and efficient autonomous vehicle control.

SUMMARY

A system and method for providing multiple agents for decision making, trajectory planning, and autonomous vehicle control are disclosed herein. Specifically, the present disclosure relates to systems, methods, and devices that facilitate the decision making and control processes in an autonomous driving mode. In an example embodiment, an autonomous vehicle control system can be bifurcated into two separate agents or subsystems: 1) a low frequency, higher load-bearing subsystem (denoted a deep computing subsystem), and 2) a high frequency, lower load-bearing subsystem (denoted a fast response subsystem). In other example embodiments to enable high-quality and responsive vehicle control processing in an autonomous driving mode, the vehicle control system can be divided into two or more separate agents or subsystems, each with a different operating frequency and different processing load capabilities. Specifically, the deep computing subsystem representing a lower frequency, higher load-bearing subsystem can bear more computational burden and generates long range autonomous driving control signals and plans that are optimized for a longer timeframe or duration. The deep computing subsystem can be implemented with high power data processing devices and configured to handle a fewer number of complex or broad-based computational requests for the vehicle control system. In contrast, the fast response subsystem representing a high frequency, lower load-bearing subsystem is configured to perform fast computations for less complex and more numerous computational requests for the vehicle control system. The fast response subsystem is configured to handle many short timeframe requests or emergency situations requiring an immediate response. For example, the fast response subsystem can be configured to process less complex requests or to make small modifications to the latest results or plans generated by the deep computing subsystem. Consequently, the disclosed systems, methods, and devices can use each of two or more levels of data processing capacity to generate plans that, on one hand, comprehensively cover a long time horizon (deep computing) and, on the other hand, can respond to high frequency requests and sudden unexpected emergency situations (fast response).

In another example embodiment, a multiple agent autonomous vehicle control system can include three separate subsystems: 1) a vehicle behavior decision making subsystem, 2) a vehicle trajectory generation subsystem, and 3) a vehicle control subsystem. It will be apparent to those of ordinary skill in the art in view of the disclosure herein that an alternative multiple agent autonomous vehicle control system can be partitioned differently into a different quantity of subsystems and still practice the teaching herein. In the example embodiment, each of the three separate subsystems can be further partitioned into multiple agents, such as a deep computing portion or agent and a fast response portion or agent as described above. Each of the three separate subsystems can thereby use their deep computing agents for responding to requests with long range autonomous driving control signals and plans that are optimized for a longer timeframe or duration. The fast response agents can be used for handling many short timeframe requests or emergency situations requiring an immediate response. As described for various example embodiments herein, one data processor can be used to handle each of the autonomous vehicle control subsystems and each of the multiple processing agents. Alternatively, multiple data processors can be used, so that each autonomous vehicle control subsystem is handled by a separate data processor. In yet another example embodiment, multiple data processors can be used, so that each of the multiple processing agents is handled by a separate data processor. Various permutations of these techniques can be similarly used within the teachings provided herein.

BRIEF DESCRIPTION OF THE DRAWINGS

The various embodiments are illustrated by way of example, and not by way of limitation, in the figures of the accompanying drawings in which:

FIG. 6 is a process flow diagram illustrating an example embodiment of a system and method for providing multiple agents for decision making, trajectory planning, and control for autonomous vehicles.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a system and method for providing multiple agents for decision making, trajectory planning, and control for autonomous vehicles are described herein. An example embodiment disclosed herein can be used in the context of an in-vehicle control system 150 in a vehicle ecosystem 101. In one example embodiment, an in-vehicle control system 150 with a multiple agent vehicle control module 200 resident in a vehicle 105 can be configured like the architecture and ecosystem 101 illustrated in FIG. 1. However, it will be apparent to those of ordinary skill in the art that the multiple agent vehicle control module 200 described and claimed herein can be implemented, configured, and used in a variety of other applications and systems as well.

Figure 1:
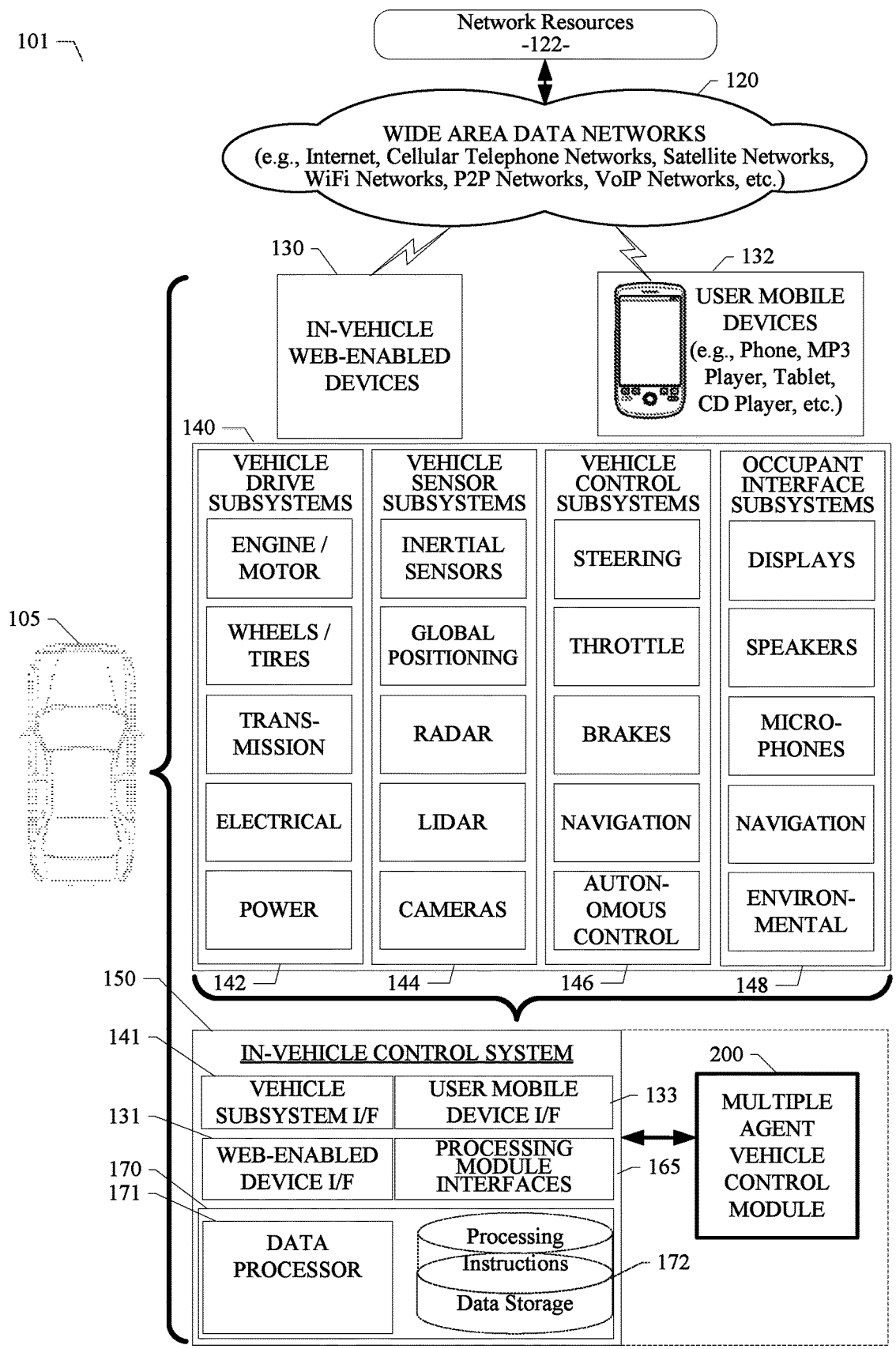
FIG. 1 illustrates a block diagram of an example ecosystem in which a multiple agent autonomous vehicle control system of an example embodiment can be implemented.

Referring now to FIG. 1, a block diagram illustrates an example ecosystem 101 in which an in-vehicle control system 150 and a multiple agent vehicle control module 200 of an example embodiment can be implemented. These components are described in more detail below. Ecosystem 101 includes a variety of systems and components that can generate and/or deliver one or more sources of information/data and related services to the in-vehicle control system 150 and the multiple agent vehicle control module 200, which can be installed in the vehicle 105. For example, a camera installed in the vehicle 105, as one of the devices of vehicle subsystems 140, can generate image and timing data that can be received by the in-vehicle control system 150. The in-vehicle control system 150 and an image processing module executing therein can receive this image and timing data input. The image processing module can extract object data from the image and timing data to identify objects in the proximity of the autonomous vehicle, such as vehicles, pedestrians, or other objects in proximity of the autonomous vehicle. Additionally, other sensor data from the vehicle subsystems 140 can be obtained and used as inputs to the multiple agent vehicle control module 200. As described in more detail below, the multiple agent vehicle control module 200 can process the image and sensor data and generate an autonomous vehicle control output for the autonomous vehicle based on the detected objects and sensor data. The autonomous vehicle control output can be used by an autonomous vehicle control subsystem, as another one of the subsystems of vehicle subsystems 140. The autonomous vehicle control subsystem, for example, can use the autonomous vehicle control output to safely and efficiently control the movement of the vehicle 105 through a real world driving environment while avoiding obstacles and safely controlling the vehicle.

In an example embodiment as described herein, the in-vehicle control system 150 can be in data communication with a plurality of vehicle subsystems 140, all of which can be resident in a user's vehicle 105. A vehicle subsystem interface 141 is provided to facilitate data communication between the in-vehicle control system 150 and the plurality of vehicle subsystems 140. The in-vehicle control system 150 can be configured to include a data processor 171 to execute the multiple agent vehicle control module 200 for processing object data and sensor data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171 and the multiple agent vehicle control module 200. In various example embodiments, a plurality of processing modules, configured similarly to multiple agent vehicle control module 200, can be provided for execution by data processor 171. As shown by the dashed lines in FIG. 1, the multiple agent vehicle control module 200 can be integrated into the in-vehicle control system 150, optionally downloaded to the in-vehicle control system 150, or deployed separately from the in-vehicle control system 150.

The in-vehicle control system 150 can be configured to receive or transmit data from/to a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing object input or object input analysis. Antennas can serve to connect the in-vehicle control system 150 and the multiple agent vehicle control module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice over IP (VoIP) networks, and the like are also well-known. Thus, as described in more detail below, the in-vehicle control system 150 and the multiple agent vehicle control module 200 can receive web-based data or content via an in-vehicle web-enabled device interface 131, which can be used to connect with the in-vehicle web-enabled device receiver 130 and network 120. In this manner, the in-vehicle control system 150 and the multiple agent vehicle control module 200 can support a variety of network-connectable in-vehicle devices and systems from within a vehicle 105.

As shown in FIG. 1, the in-vehicle control system 150 and the multiple agent vehicle control module 200 can also receive data, object processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, object processing control parameters, and content for the in-vehicle control system 150 and the multiple agent vehicle control module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the multiple agent vehicle control module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the multiple agent vehicle control module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, energy cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based energy, propane, other compressed gas-based energy, ethanol, energy cell, solar panels, batteries, and other sources of electrical power. The power source could additionally or alternatively include any combination of energy tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the vehicle 105 (e.g., an O2 monitor, an energy gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit. The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the multiple agent vehicle control module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the multiple agent vehicle control module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as object processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and move in a controlled manner or follow a path or trajectory based on the vehicle motion control output generated by the multiple agent vehicle control module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and multiple agent vehicle control module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the multiple agent vehicle control module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the multiple agent vehicle control module 200 can be implemented as in-vehicle components of vehicle 105. In various example embodiments, the in-vehicle control system 150 and the multiple agent vehicle control module 200 in data communication therewith can be implemented as integrated components or as separate components. In an example embodiment, the software components of the in-vehicle control system 150 and/or the multiple agent vehicle control module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

Figure 2:
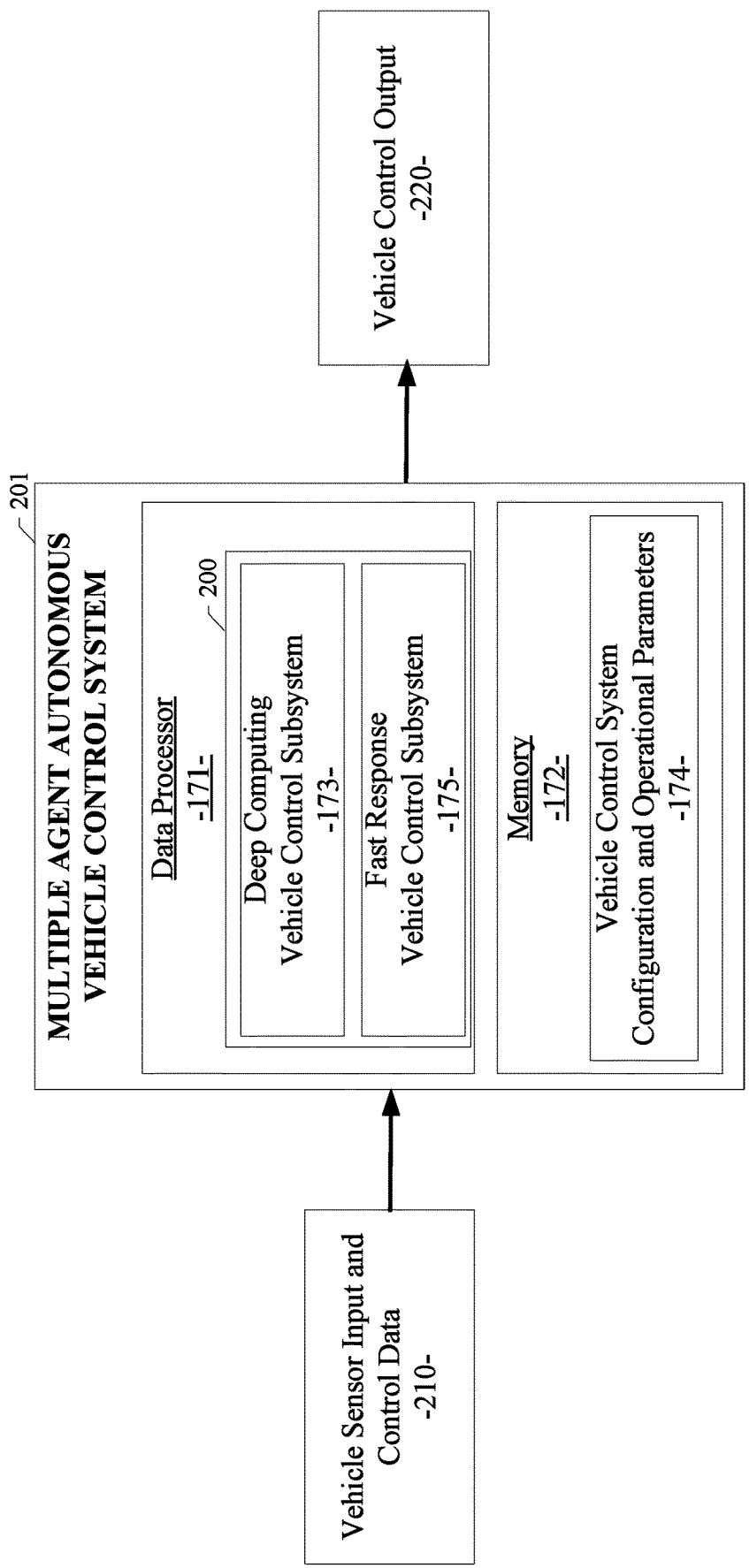
FIG. 2 illustrates the components of the multiple agent autonomous vehicle control system of an example embodiment.

Referring now to FIG. 2, a diagram illustrates the components of the multiple agent autonomous vehicle control system 201 with the multiple agent vehicle control module 200 of an example embodiment therein. In the example embodiment, the multiple agent vehicle control module 200 can be configured to include a deep computing vehicle control subsystem 173 and a fast response vehicle control subsystem 175. As described in more detail below, the deep computing vehicle control subsystem 173 and the fast response vehicle control subsystem 175 serve to enable generation of a vehicle control output 220 for the autonomous vehicle 105 based on vehicle sensor input and control data 210 received from one or more of the vehicle subsystems 140 and vehicle control system configuration and operational parameters 174 maintained in data storage 172 or obtained from a network resource 122. The vehicle sensor input and control data 210, received from one or more of the vehicle subsystems 140, can include image data from one or more cameras, and processed by an image processing module to identify proximate objects (e.g., moving vehicles, dynamic objects, static objects, or other objects in the proximate vicinity of the vehicle 105). The process of semantic segmentation can be used for the analysis of the image data and the identification of the proximate objects. The vehicle sensor input and control data 210 can also include task requests from any of the vehicle subsystems 140 for information or the handling of particular data processing tasks. The sensor information and task requests as part of the vehicle sensor input and control data 210 can be received and used by the deep computing vehicle control subsystem 173 or the fast response vehicle control subsystem 175 as part of a multiple agent autonomous vehicle control process as described in more detail below.

The deep computing vehicle control subsystem 173 and the fast response vehicle control subsystem 175 can be configured as software modules executed by the data processor 171 of the in-vehicle control system 150. The modules 173 and 175 of the multiple agent vehicle control module 200 can receive the vehicle sensor input and control data 210 and produce a vehicle control output 220, which can be used by the various autonomous vehicle control subsystems 140 to more efficiently and safely control the vehicle 105 to achieve fast and efficient operation. As part of their vehicle control processing, the deep computing vehicle control subsystem 173 and the fast response vehicle control subsystem 175 can be configured to work with vehicle control system configuration and operational parameters 174, which can be used to customize and fine tune the operation of the multiple agent vehicle control module 200. The vehicle control system configuration and operational parameters 174 can be stored in a memory 172 of the in-vehicle control system 150.

In the example embodiment, the multiple agent vehicle control module 200 can be configured to include an interface with the in-vehicle control system 150, as shown in FIG. 1, through which the multiple agent vehicle control module 200 can send and receive data as described herein. Additionally, the multiple agent vehicle control module 200 can be configured to include an interface with the in-vehicle control system 150 and/or other ecosystem 101 subsystems through which the multiple agent vehicle control module 200 can receive ancillary data from the various data sources described above. As described above, the multiple agent vehicle control module 200 can also be implemented in systems and platforms that are not deployed in a vehicle and not necessarily used in or with a vehicle.

In an example embodiment as shown in FIG. 2, the multiple agent vehicle control module 200 can be configured to include the deep computing vehicle control subsystem 173 and the fast response vehicle control subsystem 175, as well as other processing modules not shown for clarity. Each of these modules can be implemented as software, firmware, or other logic components executing or activated within an executable environment of the multiple agent vehicle control module 200 operating within or in data communication with the in-vehicle control system 150. Each of these modules of an example embodiment is described in more detail below in connection with the figures provided herein.

System and Method for Providing Multiple Agents for Decision Making, Trajectory Planning, and Control for Autonomous Vehicles A system and method for providing multiple agents for decision making, trajectory planning, and autonomous vehicle control are disclosed herein. Specifically, the present disclosure relates to systems, methods, and devices that facilitate the decision making and control processes in an autonomous driving mode. In an example embodiment, an autonomous vehicle control system can be bifurcated into two separate agents or subsystems: 1) a low frequency, higher load-bearing subsystem (denoted a deep computing subsystem), and 2) a high frequency, lower load-bearing subsystem (denoted a fast response subsystem). In other example embodiments to enable high-quality and responsive vehicle control processing in an autonomous driving mode, the vehicle control system can be divided into two or more separate subsystems, each with a different operating frequency and different processing load capabilities. Specifically, the deep computing subsystem representing a lower frequency, higher load-bearing subsystem bears more computational burden and generates long range autonomous driving control signals and plans that are optimized for a longer timeframe or duration. The deep computing subsystem can be implemented with high power data processing devices and configured to handle a fewer number of complex or broad-based computational requests for the vehicle control system. In contrast, the fast response subsystem representing a high frequency, lower load-bearing subsystem is configured to perform fast computations for less complex and more numerous computational requests for the vehicle control system. The fast response subsystem is configured to handle many short timeframe requests or emergency situations requiring an immediate response. For example, the fast response subsystem can be configured to process less complex requests or to make small modifications to the latest results or plans generated by the deep computing subsystem. Consequently, the disclosed systems, methods, and devices can use each of two or more levels of data processing capacity to generate plans that, on one hand, comprehensively cover a long time horizon (deep computing) and, on the other hand, can respond to high frequency requests and sudden unexpected emergency situations (fast response).

In another example embodiment, a multiple agent autonomous vehicle control system can include three separate subsystems: 1) a vehicle behavior decision making subsystem, 2) a vehicle trajectory generation subsystem, and 3) a vehicle control subsystem. It will be apparent to those of ordinary skill in the art in view of the disclosure herein that an alternative multiple agent autonomous vehicle control system can be partitioned differently into a different quantity of subsystems and still practice the teaching herein. In the example embodiment, each of the three separate subsystems can be further partitioned into multiple agents, such as a deep computing portion or agent and a fast response portion or agent as described above. Each of the three separate subsystems can thereby use their deep computing agent for responding to requests with long range autonomous driving control signals and plans that are optimized for a longer timeframe or duration. The fast response agent can be used for handling many short timeframe requests or emergency situations requiring an immediate response. As described for various example embodiments herein, one data processor can be used to handle each of the autonomous vehicle control subsystems and each of the multiple processing agents. Alternatively, multiple data processors can be used, so that each autonomous vehicle control subsystem is handled by a separate data processor. In yet another example embodiment, multiple data processors can be used, so that each of the multiple processing agents is handled by a separate data processor. Various permutations of these techniques can be similarly used within the teachings provided herein.

Referring again to FIG. 2, the deep computing vehicle control subsystem 173 and the fast response vehicle control subsystem 175 serve to enable generation of a vehicle control output 220 for the autonomous vehicle 105 based on vehicle sensor input and control data 210 received from one or more of the vehicle subsystems 140 and vehicle control system configuration and operational parameters 174 maintained in data storage 172 or obtained from a network resource 122. In the example embodiment shown in FIG. 2, the multiple agent autonomous vehicle control system 201 can be bifurcated into two separate agents or subsystems: 1) a low frequency, higher load-bearing subsystem (denoted deep computing subsystem 173), and 2) a high frequency, lower load-bearing subsystem (denoted fast response subsystem 175). The vehicle sensor input and control data 210 can initially be received by the multiple agent vehicle control module 200. Based on the type of task request received from one of the vehicle subsystems 140 as encoded into the received vehicle sensor input and control data 210, the multiple agent vehicle control module 200 can pass the received task request to either the deep computing subsystem 173 or the fast response subsystem 175. The context in which the vehicle is currently operating can also be used as a factor for determining whether it is appropriate to pass the received task request to the deep computing subsystem 173 or the fast response subsystem 175. For example, a task request that is flagged as an urgent or emergency request can be dispatched to the fast response subsystem 175. Similarly, a task request received while the vehicle is operating in a context requiring urgent action (e.g., a proximate object has been detected requiring immediate braking or evasive steering, the vehicle is approaching a turn and needs urgent routing information, a mechanical problem in the vehicle has been detected, etc.) can be dispatched to the fast response subsystem 175. Conversely, a task request or a task type corresponding to or appropriate for a task not requiring urgent action (e.g., a task for generating a long-range routing plan, re-training a neural network, performing system diagnostics or backups, etc.) can be dispatched to the deep computing vehicle control subsystem 173. In an example embodiment, task requests received via the vehicle sensor input and control data 210 can be executed in parallel by the deep computing vehicle control subsystem 173 and the fast response subsystem 175. A pre-emptive multitasking operating system running on the multiple agent vehicle control module 200 can be used to implement this parallel processing using the single data processor 171. A higher execution priority can be given to the fast response subsystem 175 enabling the fast response subsystem 175 to preempt the execution of the deep computing vehicle control subsystem 173 when necessary. In other embodiments, the task requests received via input 210 can be executed serially by the deep computing vehicle control subsystem 173 and the fast response subsystem 175. At the completion of their processing of a received task request, either the deep computing vehicle control subsystem 173 or the fast response subsystem 175 can provide output as vehicle control output 220, which can be used by any of the vehicle subsystems 140 to control the operation of the autonomous vehicle 105. In an example embodiment, the fast response subsystem 175 can also modify the output of the deep computing vehicle control subsystem 173 or modify parameters being by the deep computing vehicle control subsystem 173 during its execution. In this manner, urgent changes in a vehicle's motion plan can be quickly applied without having to restart a long-duration execution by the deep computing vehicle control subsystem 173. Thus, the deep computing vehicle control subsystem 173 and the fast response vehicle control subsystem 175 serve to enable generation of the vehicle control output 220 for the autonomous vehicle 105 based on vehicle sensor input and control data 210 received from one or more of the vehicle subsystems 140. The processing performed by the deep computing vehicle control subsystem 173 and the fast response vehicle control subsystem 175 can be configured by use of the vehicle control system configuration and operational parameters 174 maintained in data storage 172 or obtained from a network resource 122.

Figure 3:
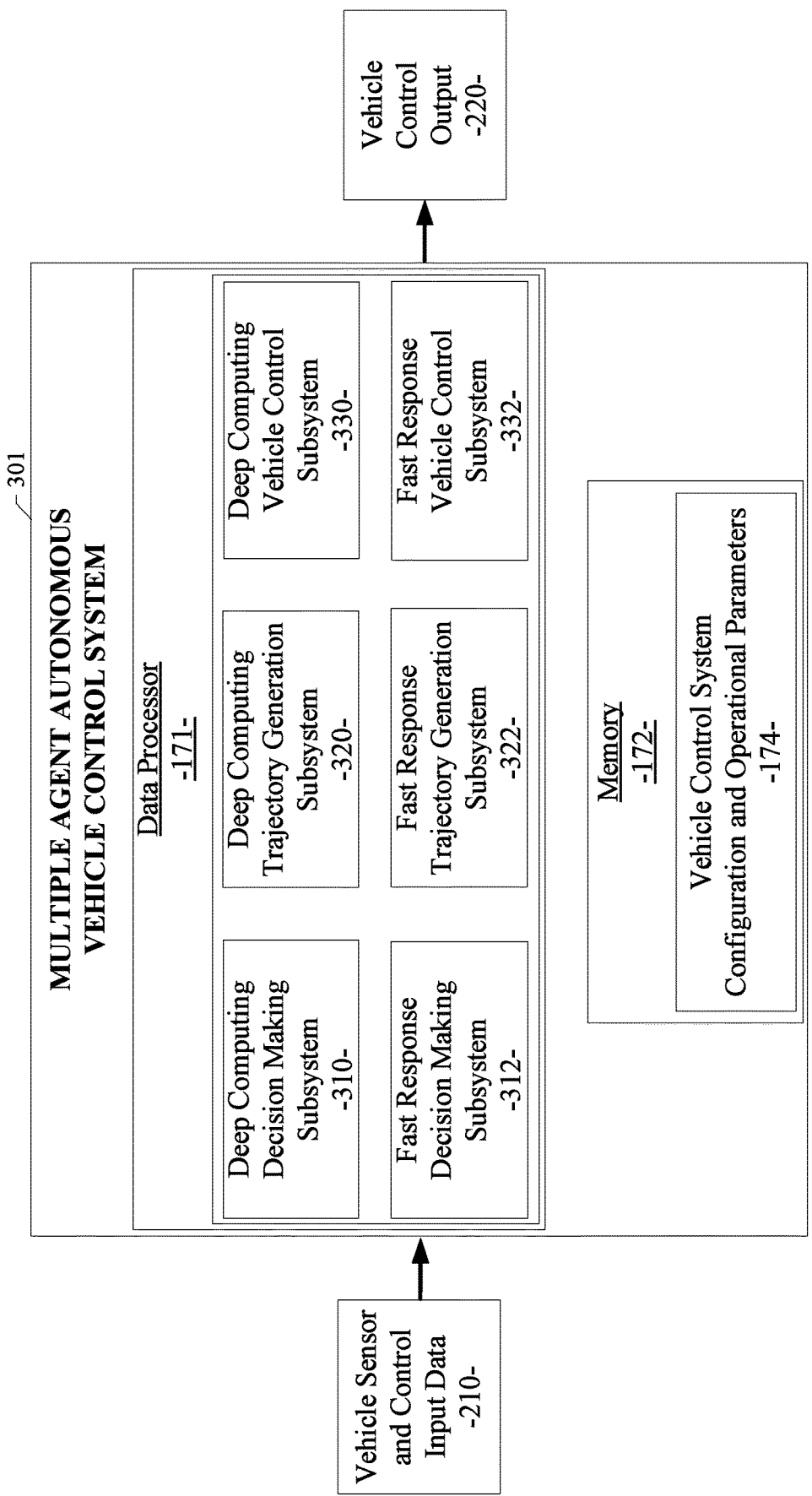
FIG. 3 illustrates the components of the multiple agent autonomous vehicle control system of an example embodiment, wherein multiple agents and multiple subsystems of the multiple agent autonomous vehicle control system are handled by a single data processor.

FIG. 3 illustrates the components of the multiple agent autonomous vehicle control system 301 of an example embodiment, wherein multiple agents and multiple subsystems of the multiple agent autonomous vehicle control system 301 are handled by a single data processor 171. In the embodiment shown in FIG. 3, the multiple agent autonomous vehicle control system 301 can include three separate subsystems: 1) a vehicle behavior decision making subsystem, 2) a vehicle trajectory generation subsystem, and 3) a vehicle control subsystem. It will be apparent to those of ordinary skill in the art in view of the disclosure herein that an alternative multiple agent autonomous vehicle control system can be partitioned differently into a different quantity of subsystems and still practice the teaching herein. In the example embodiment, each of the three separate subsystems can be further partitioned into multiple agents, such as a deep computing agent and a fast response agent as described above. Thus as shown in FIG. 3, the multiple agent autonomous vehicle control system 301 of an example embodiment can include a deep computing decision making subsystem 310, a fast response decision making subsystem 312, a deep computing trajectory generation subsystem 320, a fast response trajectory generation subsystem 322, a deep computing vehicle control subsystem 330, and a fast response vehicle control subsystem 332. In system 301, the combination of the deep computing decision making subsystem 310 and the fast response decision making subsystem 312 represents the vehicle behavior decision making subsystem having multiple agents: subsystem agents 310 and 312. The combination of the deep computing trajectory generation subsystem 320 and the fast response trajectory generation subsystem 322 represents the vehicle trajectory generation subsystem having multiple agents: subsystem agents 320 and 322. The combination of the deep computing vehicle control subsystem 330 and the fast response vehicle control subsystem 332 represents the vehicle control subsystem having multiple agents: subsystem agents 330 and 332. The system architecture for the system 301 as shown on FIG. 3 enables the more granular partitioning of task requests into one or more of the multiple subsystems and agents. For example, a task request received via the vehicle sensor and control data input 210 associated with a vehicle behavior decision making activity can be dispatched to either the subsystem agents 310 or 312. As described above, longer term or less urgent decision making tasks can be dispatched to the deep computing decision making subsystem 310. More urgent or less complex decision making tasks can be dispatched to the fast response decision making subsystem 312. Similarly, a task request received via the vehicle sensor and control data input 210 associated with a vehicle trajectory generation activity can be dispatched to either the subsystem agents 320 or 322. As described above, longer term or less urgent trajectory generation tasks can be dispatched to the deep computing trajectory generation subsystem 320. More urgent or less complex trajectory generation tasks can be dispatched to the fast response trajectory generation subsystem 322. Finally, a task request received via the vehicle sensor and control data input 210 associated with a vehicle control activity can be dispatched to either the subsystem agents 330 or 332. As described above, longer term or less urgent vehicle control tasks can be dispatched to the deep computing vehicle control subsystem 330. More urgent or less complex vehicle control tasks can be dispatched to the fast response vehicle control subsystem 332.

In the example embodiment, each of the three separate subsystems (e.g., decision making 310/312, trajectory generation 320/322, and vehicle control 330/332) can thereby use their deep computing agents 310/320/330 for responding to requests with long range autonomous driving control signals and plans that are optimized for a longer timeframe or duration. The fast response agents 312/322/332 can be used for handling many short timeframe requests or emergency situations requiring an immediate response. As described for an example embodiment herein, one data processor 171 can be used to handle each of the autonomous vehicle control subsystems and each of the multiple processing agents as shown in FIG. 3. As described above, a pre-emptive multitasking operating system can be used to process each of the multiple subsystems and agents. As such, the multiple subsystems and agents can be executed in parallel to efficiently process the task requests received via the input 210.

Figure 4:
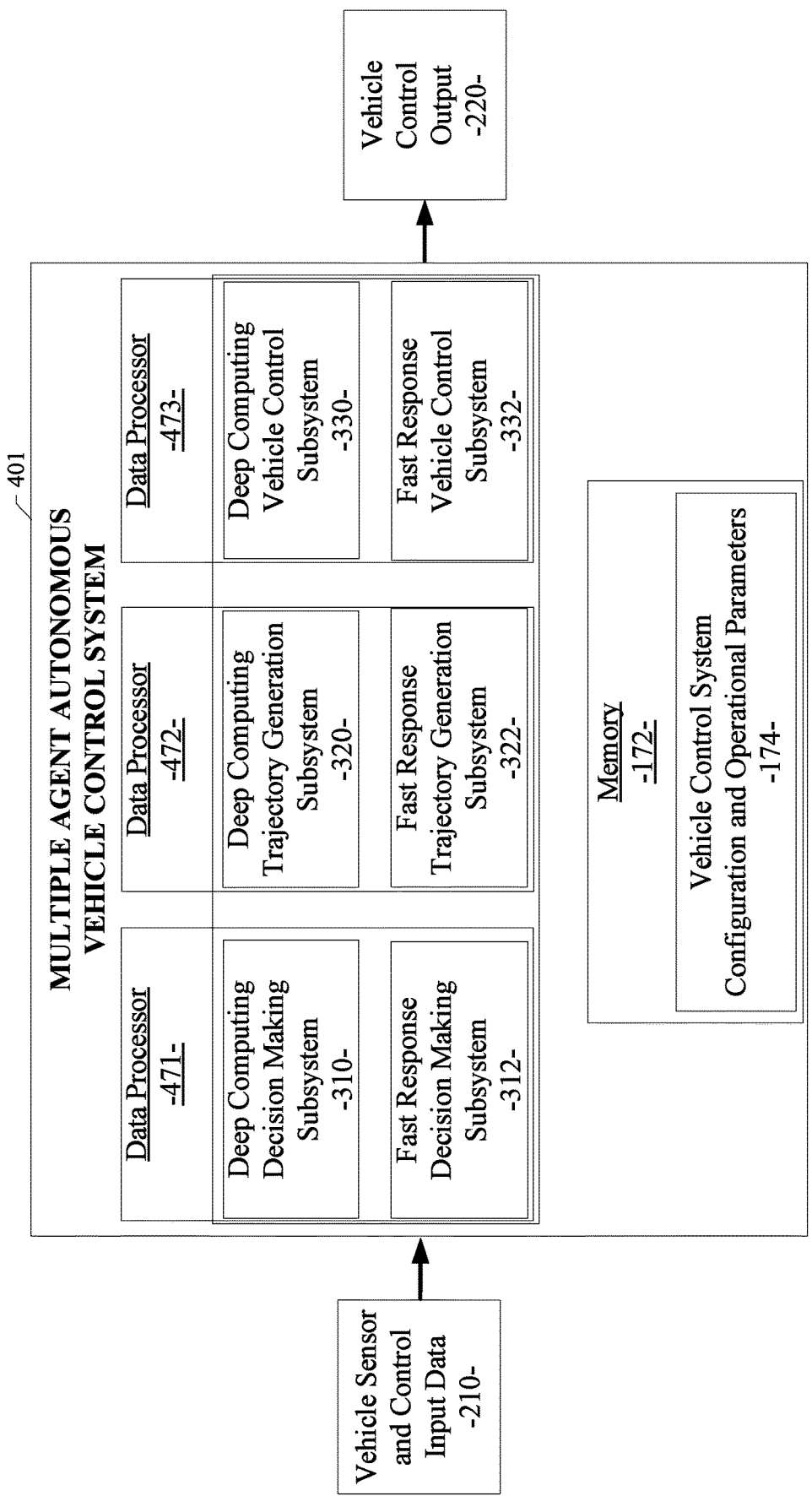
FIG. 4 illustrates the components of the multiple agent autonomous vehicle control system of an example embodiment, wherein multiple subsystems of the multiple agent autonomous vehicle control system are handled by different data processors.

FIG. 4 illustrates the components of the multiple agent autonomous vehicle control system 401 of an example embodiment, wherein multiple subsystems of the multiple agent autonomous vehicle control system 401 are handled by different data processors. In system 401, multiple data processors 471/472/473 can be used in parallel, so that each autonomous vehicle control subsystem is handled by a separate data processor. In the embodiment shown in FIG. 4, the multiple agent autonomous vehicle control system 401 can include three separate subsystems: 1) a vehicle behavior decision making subsystem, 2) a vehicle trajectory generation subsystem, and 3) a vehicle control subsystem. It will be apparent to those of ordinary skill in the art in view of the disclosure herein that an alternative multiple agent autonomous vehicle control system can be partitioned differently into a different quantity of subsystems and still practice the teaching herein. In the example embodiment, each of the three separate subsystems can be further partitioned into multiple agents, such as a deep computing agent and a fast response agent as described above. Thus as shown in FIG. 4, the multiple agent autonomous vehicle control system 401 of an example embodiment can include a deep computing decision making subsystem 310, a fast response decision making subsystem 312, a deep computing trajectory generation subsystem 320, a fast response trajectory generation subsystem 322, a deep computing vehicle control subsystem 330, and a fast response vehicle control subsystem 332. The combination of the deep computing decision making subsystem 310 and the fast response decision making subsystem 312 represents the vehicle behavior decision making subsystem having multiple agents: subsystem agents 310 and 312. The combination of the deep computing trajectory generation subsystem 320 and the fast response trajectory generation subsystem 322 represents the vehicle trajectory generation subsystem having multiple agents: subsystem agents 320 and 322. The combination of the deep computing vehicle control subsystem 330 and the fast response vehicle control subsystem 332 represents the vehicle control subsystem having multiple agents: subsystem agents 330 and 332. As described above, longer term or less urgent processing tasks can be dispatched to the deep computing subsystems 310/320/330. More urgent or less complex tasks can be dispatched to the fast response subsystems 312/322/332. However, in the example embodiment shown in FIG. 4, different independent data processors 471/472/473 can be used to process the task requests received for the multiple subsystems and multiple agents. For example, data processor 471 can be dedicated to handling the processing needs of the decision making subsystem 310/312. The data processor 472 can be dedicated to handling the processing needs of the trajectory generation subsystem 320/322. The data processor 473 can be dedicated to handling the processing needs of the vehicle control subsystem 330/332. Each of the processors 471/472/473 can execute for their respective subsystems concurrently and in parallel. Additionally, as described above, each processor 471/472/473 can execute for their respective agents in parallel by use of a pre-emptive multitasking operating system. As a result, the high degree of processing concurrency enables the efficient processing of task requests received from the various vehicle subsystems 140.

Figure 5:
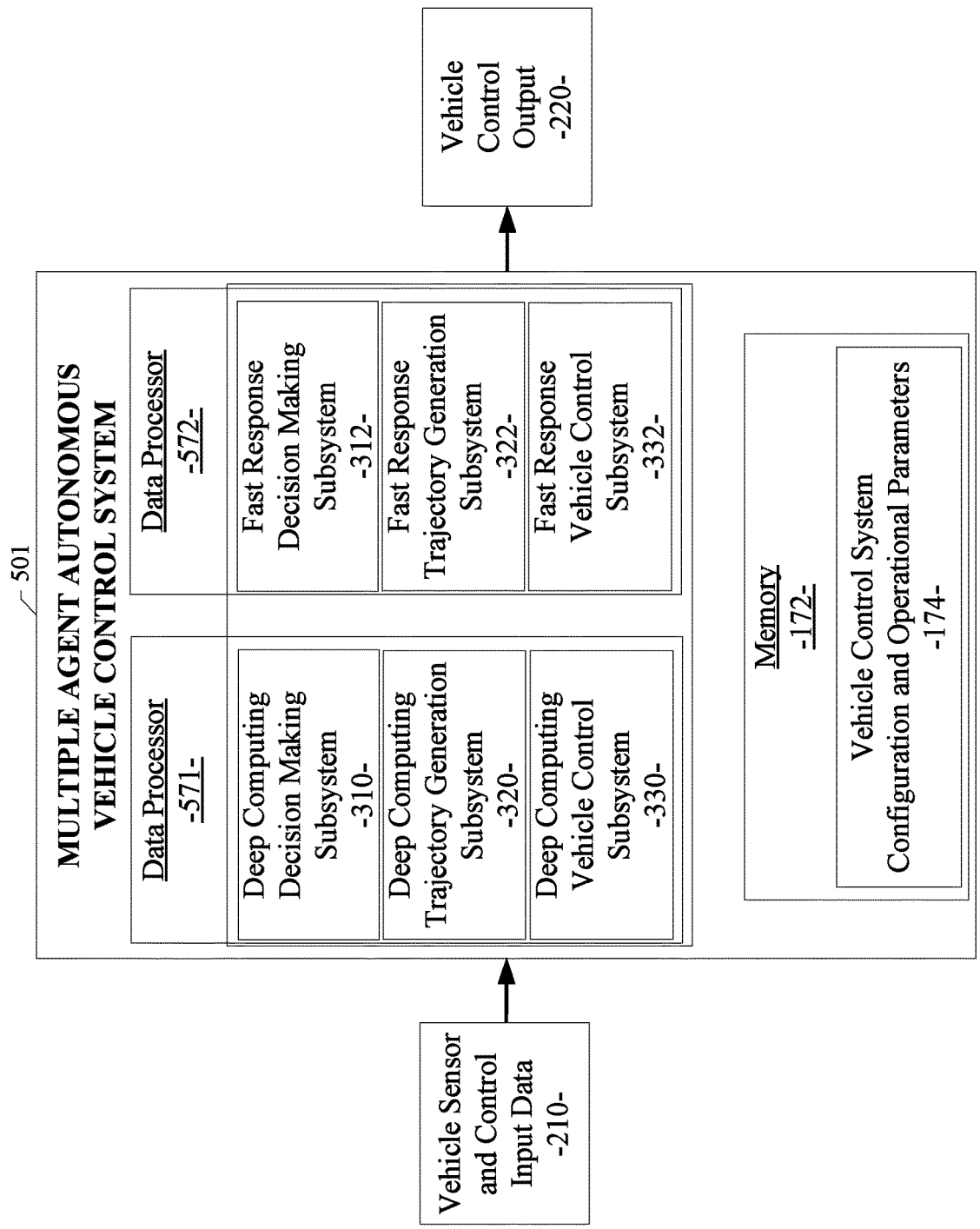
FIG. 5 illustrates the components of the multiple agent autonomous vehicle control system of an example embodiment, wherein multiple agents, each having multiple subsystems, are handled by different data processors.

FIG. 5 illustrates the components of the multiple agent autonomous vehicle control system 501 of an example embodiment, wherein multiple agents, each having multiple subsystems, are handled by different data processors. In system 501, multiple data processors 571/572 can be used in parallel, so that each multiple agent is handled by a separate data processor. In the example embodiment shown in FIG. 5, multiple agents of the multiple agent autonomous vehicle control system 501 can be defined to represent a deep computing agent and a fast response agent as described above. The deep computing agent shown in FIG. 5 can comprise a combination of the deep computing decision making subsystem 310, the deep computing trajectory generation subsystem 320, and the deep computing vehicle control subsystem 330. The fast response agent shown in FIG. 5 can comprise a combination of the fast response decision making subsystem 312, the fast response trajectory generation subsystem 322, and the fast response vehicle control subsystem 332. The deep computing agent 310/320/330 can be executed by data processor 571. The fast response agent 312/322/332 can be executed by data processor 572. As described above, longer term or less urgent processing tasks can be dispatched to the deep computing subsystems 310/320/330. More urgent or less complex tasks can be dispatched to the fast response subsystems 312/322/332. However, in the example embodiment shown in FIG. 5, different independent data processors 571/572 can be used to process the task requests received for the multiple agents and multiple subsystems. For example, data processor 571 can be dedicated to handling the processing needs of the deep computing agent 310/320/330. The data processor 572 can be dedicated to handling the processing needs of the fast response agent 312/322/332. Each of the processors 571/572 can execute for their respective agents concurrently and in parallel. Additionally, as described above, each processor 571/572 can execute for their respective subsystems in parallel by use of a pre-emptive multitasking operating system. As a result, the high degree of processing concurrency enables the efficient processing of task requests received from the various vehicle subsystems 140.

Referring now to FIG. 6, a flow diagram illustrates an example embodiment of a system and method 1000 for providing multiple agents for decision making, trajectory planning, and control for autonomous vehicles. The example embodiment can be configured for: partitioning a multiple agent autonomous vehicle control module for an autonomous vehicle into a plurality of subsystem agents, the plurality of subsystem agents including a deep computing vehicle control subsystem and a fast response vehicle control subsystem (processing block 1010); receiving a task request from a vehicle subsystem (processing block 1020); determining if the task request is appropriate for the deep computing vehicle control subsystem or the fast response vehicle control subsystem based on content of the task request or a context of the autonomous vehicle (processing block 1030); dispatching the task request to the deep computing vehicle control subsystem or the fast response vehicle control subsystem based on the determination (processing block 1040); causing execution of the deep computing vehicle control subsystem or the fast response vehicle control subsystem by use of a data processor to produce a vehicle control output (processing block 1050); and providing the vehicle control output to a vehicle control subsystem of the autonomous vehicle (processing block 1060).

As used herein and unless specified otherwise, the term "mobile device" includes any computing or communications device that can communicate with the in-vehicle control system 150 and/or the multiple agent vehicle control module 200 described herein to obtain read or write access to data signals, messages, or content communicated via any mode of data communications. In many cases, the mobile device 130 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 130 can be a computing device, personal computer (PC), multiprocessor system, microprocessor-based or programmable consumer electronic device, network PC, diagnostics equipment, a system operated by a vehicle 119 manufacturer or service technician, and the like, and is not limited to portable devices. The mobile device 130 can receive and process data in any of a variety of data formats. The data format may include or be configured to operate with any programming format, protocol, or language including, but not limited to, JavaScript, C++, iOS, Android, etc.

As used herein and unless specified otherwise, the term "network resource" includes any device, system, or service that can communicate with the in-vehicle control system 150 and/or the multiple agent vehicle control module 200 described herein to obtain read or write access to data signals, messages, or content communicated via any mode of inter-process or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle 119 manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the in-vehicle control system 150 and/or the multiple agent vehicle control module 200 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The in-vehicle control system 150 and/or the multiple agent vehicle control module 200 can be implemented using systems that enhance the security of the execution environment, thereby improving security and reducing the possibility that the in-vehicle control system 150 and/or the multiple agent vehicle control module 200 and the related services could be compromised by viruses or malware. For example, the in-vehicle control system 150 and/or the multiple agent vehicle control module 200 can be implemented using a Trusted Execution Environment, which can ensure that sensitive data is stored, processed, and communicated in a secure way.

Figure 7:
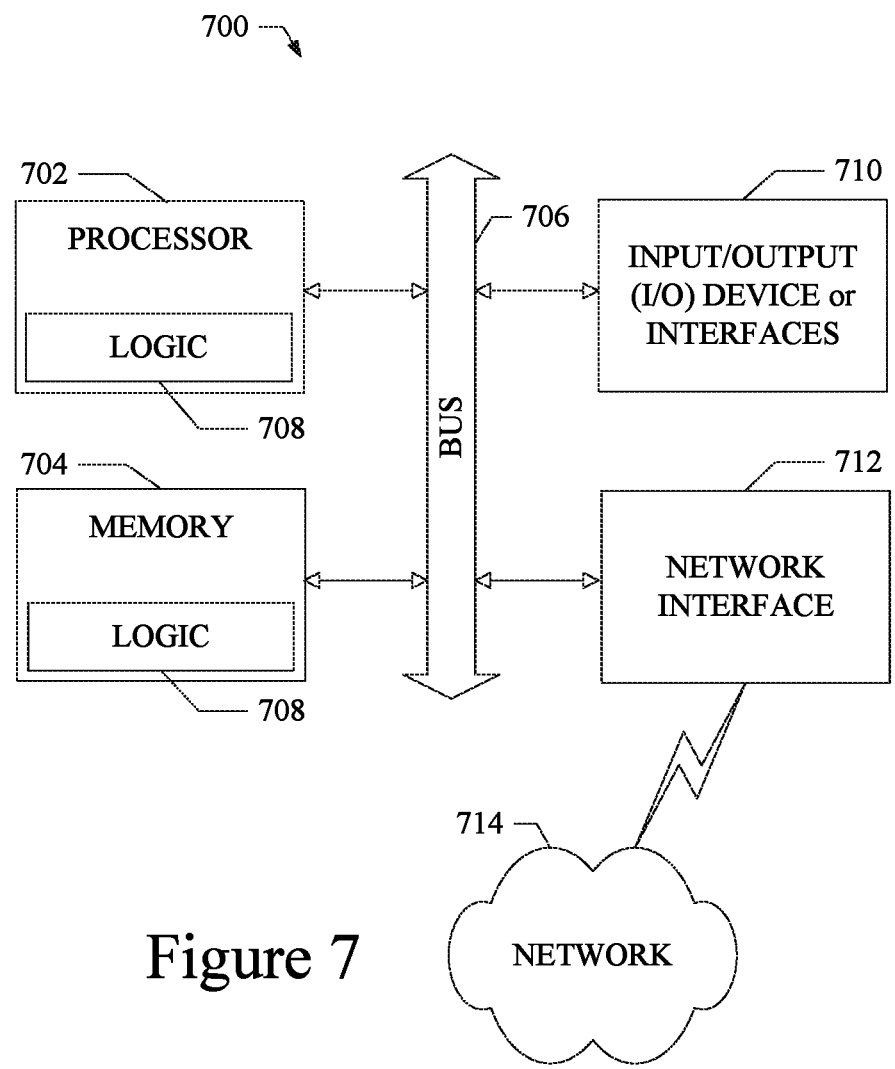
FIG. 7 shows a diagrammatic representation of machine in the example form of a computer system within which a set of instructions when executed may cause the machine to perform any one or more of the methodologies discussed herein.

FIG. 7 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
    a data processor; and
    a memory for storing a multiple agent autonomous vehicle control module, executable by the data processor, the multiple agent autonomous vehicle control module being a data processing module configured to perform an autonomous vehicle control operation for an autonomous vehicle, the multiple agent autonomous vehicle control module being partitioned into a plurality of subsystem agents, the plurality of subsystem agents including a deep computing vehicle control subsystem and a fast response vehicle control subsystem, the fast response vehicle control subsystem configured to preempt the deep computing vehicle control subsystem if the fast response vehicle control subsystem and the deep computing vehicle control subsystem are executed by the same data processor, the autonomous vehicle control operation being configured to:
        receive a task request from a vehicle subsystem;
        determine, by use of the data processor, if the task request is appropriate for the deep computing vehicle control subsystem or the fast response vehicle control subsystem based on content of the task request or a context of the autonomous vehicle;
        dispatch, by use of the data processor, the task request to the deep computing vehicle control subsystem or the fast response vehicle control subsystem based on the determination;
        cause execution of the deep computing vehicle control subsystem or the fast response vehicle control subsystem by use of the data processor to produce a vehicle control output; and
        provide the vehicle control output to a vehicle control subsystem of the autonomous vehicle.

2. The system of claim 1 being further configured to receive sensor data from a plurality of sensors on the autonomous vehicle.

3. The system of claim 1 wherein the execution of the deep computing vehicle control subsystem and the fast response vehicle control subsystem by use of the data processor is performed in parallel.

4. The system of claim 1 wherein the execution of the deep computing vehicle control subsystem and the fast response vehicle control subsystem is performed by different data processors.

5. The system of claim 1 wherein the multiple agent autonomous vehicle control module being further partitioned into a plurality of subsystems, the plurality of subsystems including a decision making subsystem, a trajectory generation subsystem, and a vehicle control subsystem.

6. The system of claim 1 wherein the multiple agent autonomous vehicle control module being further partitioned into a plurality of subsystems, the plurality of subsystems including a decision making subsystem, a trajectory generation subsystem, and a vehicle control subsystem, the execution of the decision making subsystem, the trajectory generation subsystem, and the vehicle control subsystem by use of the data processor is performed in parallel.

7. The system of claim 1 wherein the vehicle control output is provided to a vehicle control subsystem causing the autonomous vehicle to follow a routing and perform vehicle motion control operations corresponding to the vehicle control output.

8. A method comprising:
    partitioning a multiple agent autonomous vehicle control module for an autonomous vehicle into a plurality of subsystem agents, the plurality of subsystem agents including a deep computing vehicle control subsystem and a fast response vehicle control subsystem, the multiple agent autonomous vehicle control module being a data processing module storable in a memory and executable by a data processor, the fast response vehicle control subsystem configured to preempt the deep computing vehicle control subsystem if the fast response vehicle control subsystem and the deep computing vehicle control subsystem are executed by the same data processor;
    receiving a task request from a vehicle subsystem;
    determining, by use of the data processor, if the task request is appropriate for the deep computing vehicle control subsystem or the fast response vehicle control subsystem based on content of the task request or a context of the autonomous vehicle;
    dispatching, by use of the data processor, the task request to the deep computing vehicle control subsystem or the fast response vehicle control subsystem based on the determination;
    causing execution of the deep computing vehicle control subsystem or the fast response vehicle control subsystem by use of the data processor to produce a vehicle control output; and
    providing the vehicle control output to a vehicle control subsystem of the autonomous vehicle.

9. The method of claim 8 including receiving sensor data from a plurality of sensors on the autonomous vehicle, the sensors being from the group consisting of: an inertial measurement unit (IMU), a Global Positioning System (GPS) transceiver, a RADAR unit, a laser range finder/LIDAR unit, and one or more cameras or image capture devices.

10. The method of claim 8 wherein the execution of the deep computing vehicle control subsystem and the fast response vehicle control subsystem is performed in parallel by different data processors.

11. The method of claim 8 wherein the completion of a task by execution of the deep computing vehicle control subsystem occurs more slowly than the completion of a task by execution of the fast response vehicle control subsystem.

12. The method of claim 8 wherein the execution of the deep computing vehicle control subsystem and the fast response vehicle control subsystem is performed by the same data processor.

13. The method of claim 8 including partitioning the multiple agent autonomous vehicle control module into a plurality of subsystems, the plurality of subsystems including a decision making subsystem, and a trajectory generation subsystem, the execution of the decision making subsystem, and the trajectory generation subsystem by use of the data processor is performed in parallel.

14. The method of claim 8 wherein the vehicle control output is provided to a vehicle control subsystem causing the autonomous vehicle to follow a routing and perform vehicle motion control operations corresponding to the vehicle control output, the vehicle control subsystem including a steering and throttle control subsystem.

15. A non-transitory machine-useable storage medium embodying instructions which, when executed by a machine, cause the machine to:
partition a multiple agent autonomous vehicle control module for an autonomous vehicle into a plurality of subsystem agents, the plurality of subsystem agents including a deep computing vehicle control subsystem and a fast response vehicle control subsystem, the multiple agent autonomous vehicle control module being a data processing module storable in a memory and executable by a data processor, the fast response vehicle control subsystem configured to preempt the deep computing vehicle control subsystem if the fast response vehicle control subsystem and the deep computing vehicle control subsystem are executed by the same data processor;
receive a task request from a vehicle subsystem;
determine if the task request is appropriate for the deep computing vehicle control subsystem or the fast response vehicle control subsystem based on content of the task request or a context of the autonomous vehicle;
dispatch the task request to the deep computing vehicle control subsystem or the fast response vehicle control subsystem based on the determination;
cause execution of the deep computing vehicle control subsystem or the fast response vehicle control subsystem by use of the data processor to produce a vehicle control output; and
provide the vehicle control output to a vehicle control subsystem of the autonomous vehicle.

16. The non-transitory machine-useable storage medium of claim 15 including receiving sensor data from a plurality of sensors on the autonomous vehicle, the sensors including one or more cameras or image capture devices.

17. The non-transitory machine-useable storage medium of claim 15 wherein the execution of the deep computing vehicle control subsystem and the fast response vehicle control subsystem is performed by the same data processor.

18. The non-transitory machine-useable storage medium of claim 15 wherein the plurality of subsystem agents including a deep computing decision making subsystem and a fast response decision making subsystem.

19. The non-transitory machine-useable storage medium of claim 15 including partitioning the multiple agent autonomous vehicle control module into a plurality of subsystems, the plurality of subsystems including a decision making subsystem, a trajectory generation subsystem, and a vehicle control subsystem.

20. The non-transitory machine-useable storage medium of claim 15 wherein the vehicle control output is provided to a vehicle control subsystem causing the autonomous vehicle to follow a routing and perform vehicle motion control operations corresponding to the vehicle control output, the vehicle control subsystem including a braking and navigation control subsystem.

* * * * *